(12) United States Patent
Alenizi

(10) Patent No.: US 8,101,896 B2
(45) Date of Patent: Jan. 24, 2012

(54) SOLAR TRACKING UNIT FOR A STEAM GENERATOR OR THE LIKE HAVING FIRST AND SECOND PLURALITY OF PHOTOVOLTAIC CELLS FOR GENERATING ELECTRICAL SIGNALS TO ROTATE A CONCAVE REFLECTOR ABOUT FIRST AND SECOND AXES, RESPECTIVELY

(76) Inventor: Jasem M. K. TH. SH. Alenizi, Jahra (KW)

( * ) Notice: Subject to any disclaimer, the term of this patent is extended or adjusted under 35 U.S.C. 154(b) by 353 days.

(21) Appl. No.: 12/555,304

(22) Filed: Sep. 8, 2009

(65) Prior Publication Data

US 2011/0056482 A1 Mar. 10, 2011

(51) Int. Cl.
*G01C 21/02* (2006.01)
(52) U.S. Cl. ...................... 250/203.4; 250/239

(58) Field of Classification Search ............... 250/203.4, 250/239; 136/244–246; 126/574–606, 694–696
See application file for complete search history.

(56) References Cited

U.S. PATENT DOCUMENTS 7,612,285 B2 * 11/2009 Horne et al. ................... 136/246
* cited by examiner

*Primary Examiner* — Que T Le
(74) *Attorney, Agent, or Firm* — Lowe Hauptman Ham & Berner LLP

(57) ABSTRACT

A solar tracking unit for concentrating the sun's rays on an absorption receptor includes one or more concave reflectors and an energy absorption receptor disposed between the sun and the reflector. An energy absorbing fluid flows through the receptor and is heated by the concentrated rays of the sun. A first plurality of photovoltaic cells are disposed about a hemispherical form for generating an electrical signal to incrementally rotate the reflector about a first axis and a second plurality of photovoltaic cells disposed about a hemispherical form to generate an electrical signal to rotate the mirror about a second axis to thereby focus the reflected rays on the receptor.

12 Claims, 9 Drawing Sheets

US 8,101,896 B2

SOLAR TRACKING UNIT FOR A STEAM GENERATOR OR THE LIKE HAVING FIRST AND SECOND PLURALITY OF PHOTOVOLTAIC CELLS FOR GENERATING ELECTRICAL SIGNALS TO ROTATE A CONCAVE REFLECTOR ABOUT FIRST AND SECOND AXES, RESPECTIVELY

FIELD OF THE INVENTION

This invention relates to a solar tracking unit for a steam generator or the like and more particularly to a solar tracking unit that automatically compensates for the movement of the earth with respect to the sun to focus the sun's rays on an energy absorption receptor to generate electrical energy or the like.

BACKGROUND FOR THE INVENTION

The recent high cost of fossil fuels such as oil, natural gas and coal plus the increase demand for energy have lead to an increased awareness of an acute need for alternative sources of energy. This awareness has been exacerbated by the concern for a supply of energy at reasonable cost, a critical need for energy independence and the economic impact on the United States of America's economy. Accordingly, there is and has been an increased emphasis on search for a better way to provide energy and at the same time to do so in an environmentally friendly manner.

It is and has been well known for many years that exposure of a material to solar rays causes an increase in the material's temperature. It is also well known that focusing the sun's rays can be used to heat an energy absorbing liquid such as water to generate steam for heating a facility or structure or for generating electrical energy. Therefore, in this time of diminishing natural resources, increased energy cost and environmental concerns, the use of solar energy, a virtually inexhaustible resource, offers an economical, efficient limitless and environmentally safe alternative for fossil fuels.

Since the early 1980's and until the present there have been a number of approaches for harnessing solar energy. For example, a U.S. patent of Cohen, U.S. Pat. No. 4,469,938 discloses a solar tracking system. As disclosed, the system provides a relatively lightweight solar collector that is properly positioned with respect to the sun. A parabolic reflector surface is included to provide a line of focus of the sunlight directed toward a cylindrical energy absorption tube. Photovoltaic cells provided on either side of the energy absorption tube are directed toward the parabolic reflector surface. A reversible motor is electrically connected to the cells and physically connected to the reflector system for correcting any misalignment with respect to the sun. The reversible motor can be used as the sole means for powering the tracking system or can be used in conjunction with an outside power source.

A more recent approach for the use of solar energy is disclosed in a U.S. Pat. No. 5,191,876 of Atchley. The Atchley patent discloses a lightweight rotatable solar collection system supported overhead with a parabolic reflector trough which continuously rotates about a fluid filled collection conduit located at the trough's focal point. The system is supported overhead preventing bending of the collection conduit, ensuring that solar rays reflected off the trough will continuously focus on the conduit. A tracking system, cooperating with the reflection assembly, monitors the location of the sun cuing the motor when rotation of the torugh is required for maximum heat collection. The efficiency acquired through a reflection assembly supported and braced overhead and used in cooperation with a system monitoring movement of the sun, allows solar heat collection for operation of a cooling and heating unit economically.

Additionally, a U.S. Pat. No. 7,331,178 of Goldman discloses a hybrid generator with alternative fuel sources for generating electricity from both solar and non-solar sources. The solar generating portion of the facility includes capability to directly generate electricity from solar insulation or to store the solar energy in a tangible medium including stored heat, or solar generating fuel. The generating facility is configured to generate electricity simultaneously from both solar and non-solar sources, as well as solely from immediate solar isolation and from solar energy stored in a tangible medium. Additionally, the solar generating capacity may be segregated; such that separate spectra of solar isolation are used to capture heat for a steam turbine based electrical generator, capture light energy for photovoltaic based electrical generation, and to grow biomass to generate a solar fuel.

Notwithstanding the above, it is presently believed that there is a need and a potential market for an improved solar tracking unit for a steam generator or the like. There should be a need for such devices because they position a mirror about two axis that are perpendicular to one another and incorporate a self-locking feature to provide stability. It is also believed that the devices in accordance with the present invention will tend to optimize the heating of a heat absorbable fluid, maximize the output of work in a more efficient manner than conventional units. Further, it is believed that the devices in accordance with the present invention can be manufactured efficiently and sold at a competitive price, will be durable in use, relatively easy to install and service and at the same time produce energy in an environmentally friendly manner, reduce the dependence on fossil fuels and used for a number of different applications.

BRIEF SUMMARY OF THE INVENTION

In essence a solar tracking unit for concentrating the sun's rays on an absorption receptor comprises and/or consists of a concave reflector for receiving and reflecting the rays of the sun. The unit also includes an energy absorption receptor disposed between the sun and the reflector together with a mass of energy absorbing fluid that flow through the receptor for heating by the reflected sun's rays that are focused on the receptor by the reflector(s).

A first plurality of photovoltaic cells is disposed about a hemispherical form for generating an electrical signal to rotate the reflector about a first axis. A first motor and a first worm gear assembly incrementally rotate the reflector about the first axis in response to a signal from the first plurality of photovoltaic cells. A second plurality of photovoltaic cells also disposed about a hemispherical form generates an electrical signal to rotate the reflector about a second axis. A second motor and a second worm gear assembly incrementally rotate the reflector about the second axis in response to a signal from the second plurality of photo cells whereby the reflector is positioned to concentrate the reflected sun's rays on the receptor.

The invention will now be described in connection with the accompanying drawings wherein like reference numbers have been used to indicate like elements.

DESCRIPTION OF THE PREFERRED EMBODIMENTS OF THE INVENTION

Figure 1:
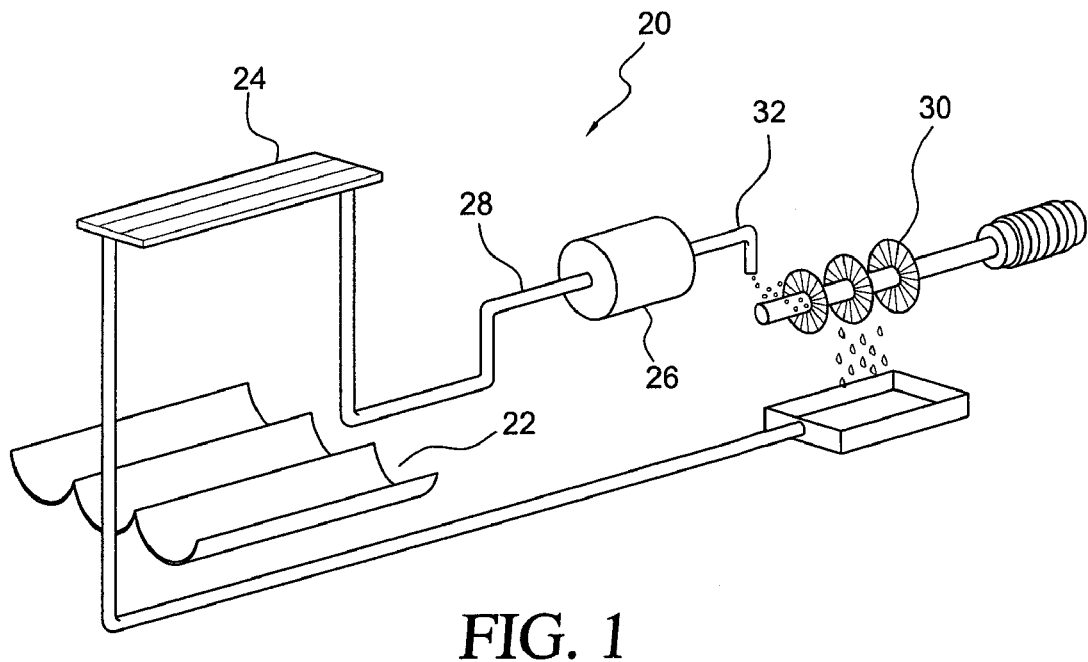
FIG. 1 is a schematic illustration of a solar powered steam turbine in accordance with the present invention.

FIG. 1 illustrates a solar steam turbine system 20 that includes a concave or parabolic mirror 22 for reflecting the sun's rays and for directing, concentrating or focusing the reflective rays on a focal point or focal line. The system 20 also includes an energy absorption receptor 24 positioned at the focal point or focal line and adapted to be heated by the reflective sunlight. In this way the receptor 24 collects a maximum amount of thermal energy during the daylight hours and transforms the absorbed energy into steam to generate electrical energy.

The system 20 also includes a mass of energy absorbing fluid such as water that flows into the receptor 24 and is converted to steam by the heat of the reflected and concentrated rays. The steam is fed to a steam drum 26 or buffer by means of a conduit 28 and subsequently into a turbine 30 by a short conduit 32. The turbine 30 then rotates a generator 34 by means of a shaft 35 to produce electrical energy. The steam after passing through the turbine is condensed by an air cooled steam condenser 36 and the resulting water is circulated back to the receptor 24 by means of a conduit 38.

Figure 2:
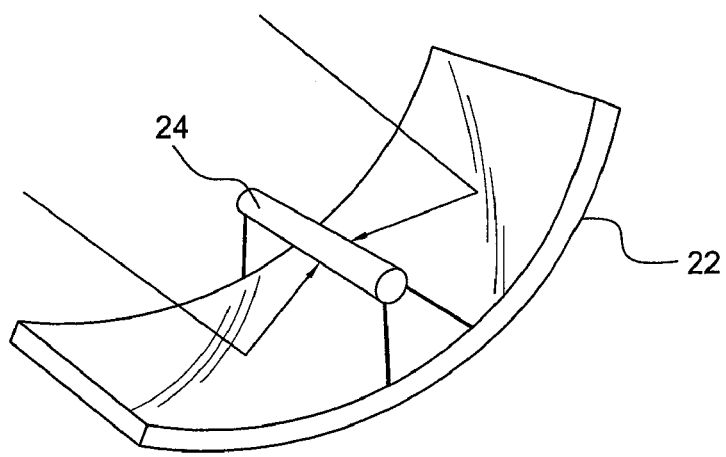
FIG. 2 is a schematic illustration of a concave mirror for focusing the rays of the sun on a focal line as used in the present invention.
Figure 3:
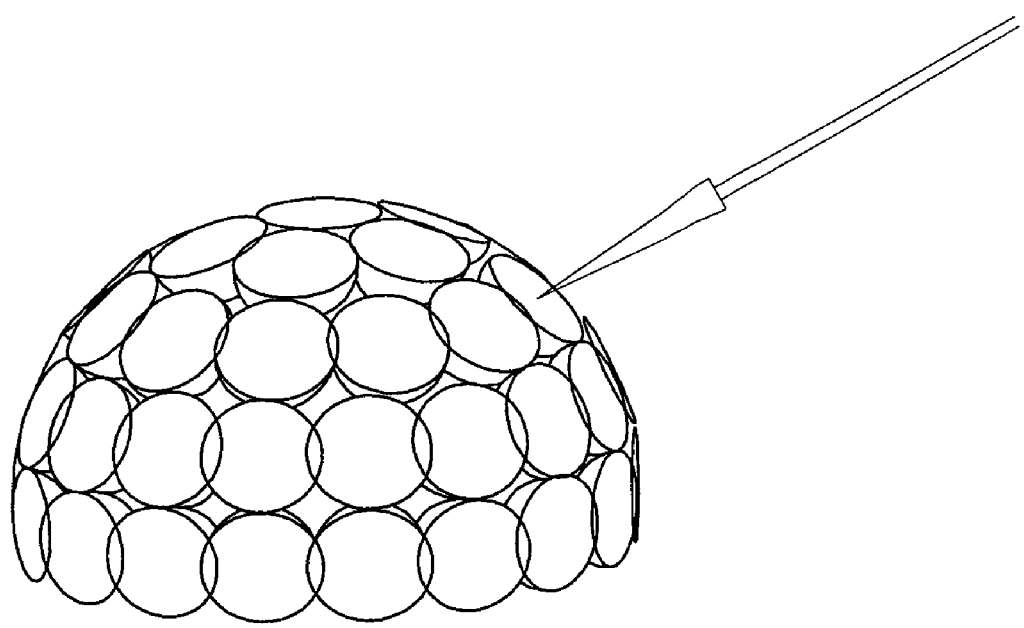
FIG. 3 is a schematic illustration of a plurality of photovoltaic cells distributed on a hemispherical form as used in the present invention.

As shown in FIG. 2 the concave or parabolic mirror or mirrors 22 focus and therefore concentrate the sun's rays on the receptor 24 to convert the energy absorbing fluid in the receptor 24 into steam. A key element in the present invention resides in the use of a plurality of photo cells 40 that are constructed and dimensioned to tightly enclose a hemispherical form as shown in FIG. 3.

Figure 4:
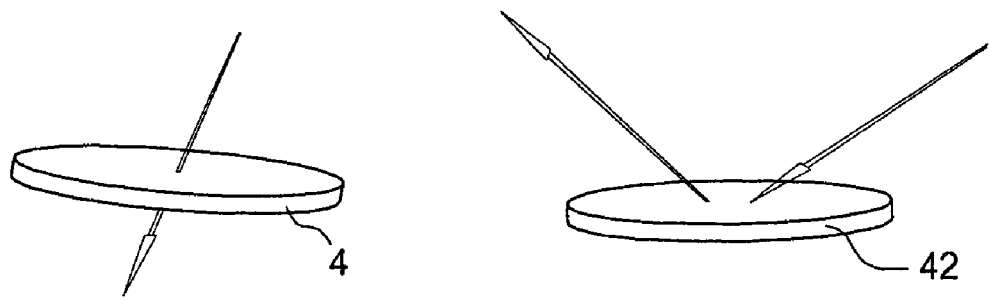
FIG. 4 is a schematic illustration of a transparent cover for limiting the penetration of sunlight to perpendicular rays.

The photoelectric cells are distributed about a hemispherical shape to receive the sun's rays as the movement of the earth with respect to the sun gives the effect of the sun moving across the sky and the changing angle of incidence in accordance with a change in seasons. Therefore, in order to have a receiver of the sun's ray according to the angle of incidence a photocell is provided for every angle within reasonable limits. Therefore each angle has an electro photo cell. Then in order to guarantee that the electro photo cell receives rays according to changes in the angle of incidence each photo cell includes a glass cover 42 of special composition or like film coating so that it will reflect all rays except those that are vertical to prevent interaction between the electro photo cells (see FIG. 4).

Figure 5:
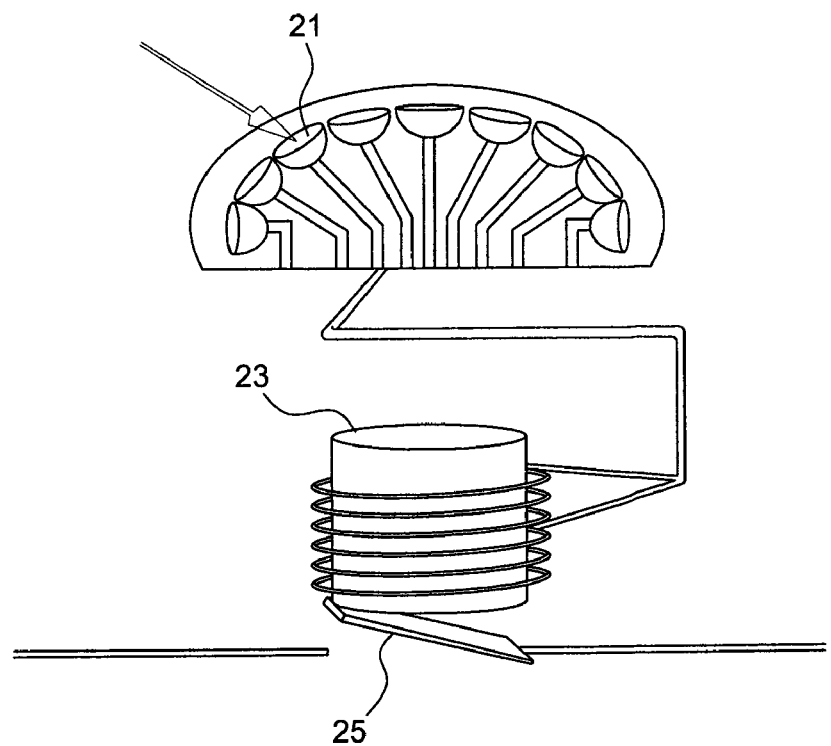
FIG. 5 is a schematic illustration of a portion of a circuit wherein an output from a photovoltaic cell opens a switch.

Referring now to FIG. 5, the sun's rays are received by one of the electric photo cells 21 that are arranged about a hemispherical form according to the angle of incidence. The photo cell that is struck by the vertical rays produces a weak electric pulse current. The electrical current is amplified by an amplifier (not shown). The amplified current passes around an iron rod 23 to form a magnet to attract an iron piece to thereby open an electrical switch 25. The switch is disposed within an electrical circuit for connecting the source of electricity to a motor that rotates the mirror 22 by means of a worm gear assembly 44.

Figure 6:
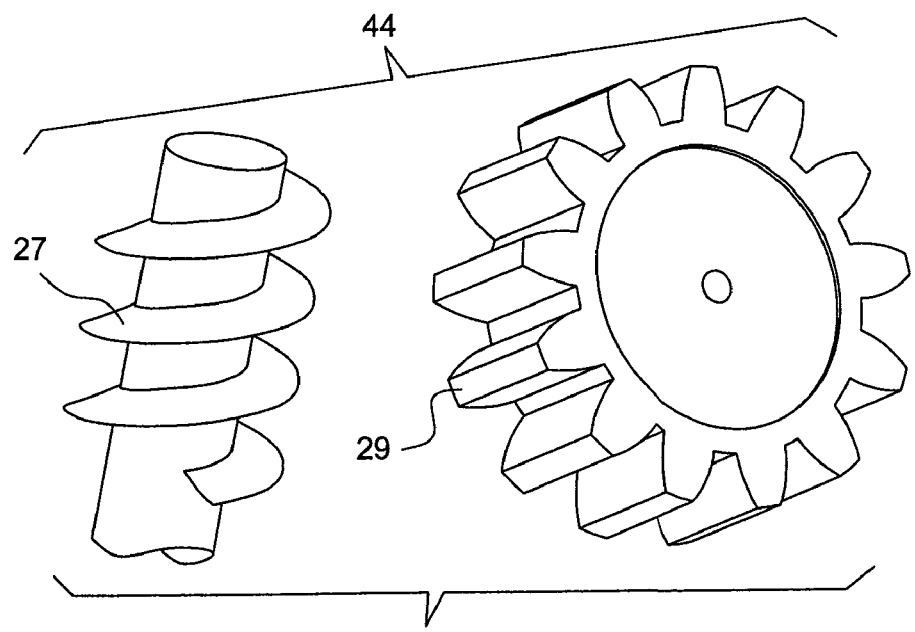
FIG. 6 is perspective view of a worm gear assembly as used in a device in accordance with the present invention.

The worm gear assembly 44 as shown in FIG. 6 includes a gear 27 which is in the form of a worm that meshes with a worm gear 29 that is in the form of a spur gear and is frequently referred to as a worm wheel. For example, the assembly 44 moves the mirror about a horizontal axis and a second worm gear assembly not shown in FIG. 6 moves the mirror about a second or vertical axis as will be well understood by a person of ordinary skill in the art. Since these gears do not move accept through the movement of the worm, they provide a self-locking feature to thereby provide stability of the mirror when it moves about an axis.

Figure 7:
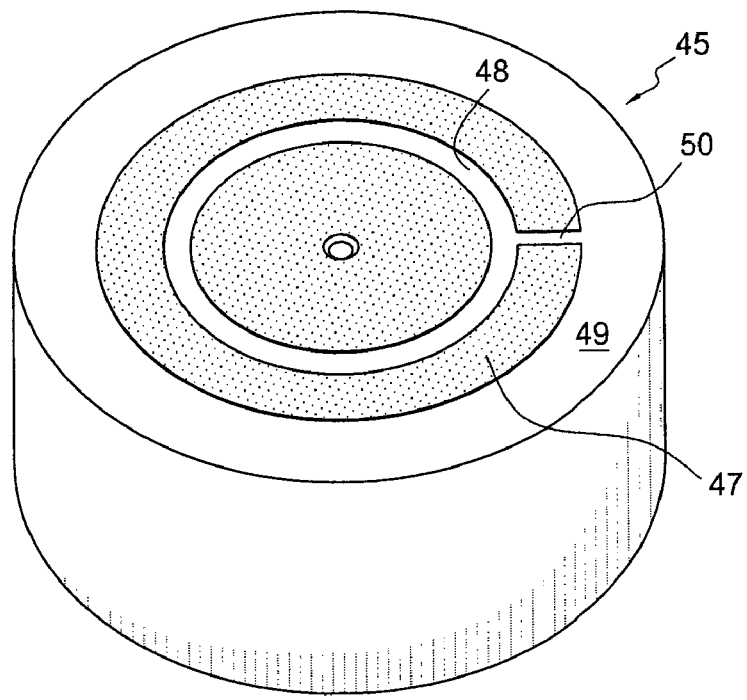
FIG. 7 is a perspective view of a first connection disc and a conductor ring as used in a preferred embodiment of the invention.

FIG. 7 shows a first connection disc 45 that includes two non-conductors, an inner ring 46 and an outer non-conductive ring 47 within a conductor ring 48 between the inner ring 46 and the outer ring 47. The disc 45 also includes a peripheral conductor ring 49. The disc 45 also includes a conductor channel 50 connecting the inner ring and the outer surface. The inner ring 48 and outer rings 49.

Figure 8:
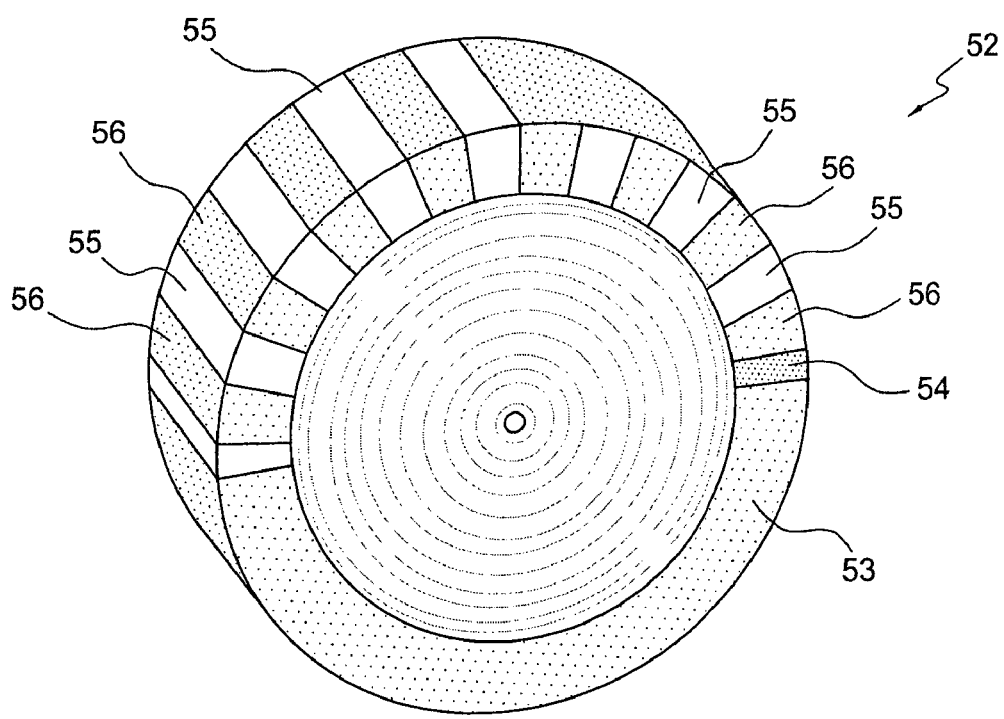
FIG. 8 is a schematic illustration of a connection disc of non-conductive material and arc shaped segments of conductive material as used in the preferred embodiment of the invention.

A second connection disc 52 is shown in FIG. 8 for rotation about a horizontal axis and includes a semi-circular outer ring 53 of non-conductive material and a semi-circular ring 54 of arch shaped conductive segments 55 supported by non-conductive segments 56. An inner portion of the second connection disc 52 also includes a plurality of conductive rings separated from one another by non-conductive rings. The conductive rings on the inner portion of the connection disc 52 are connected to the conductive segments on the outer portion thereof.

Figure 9:
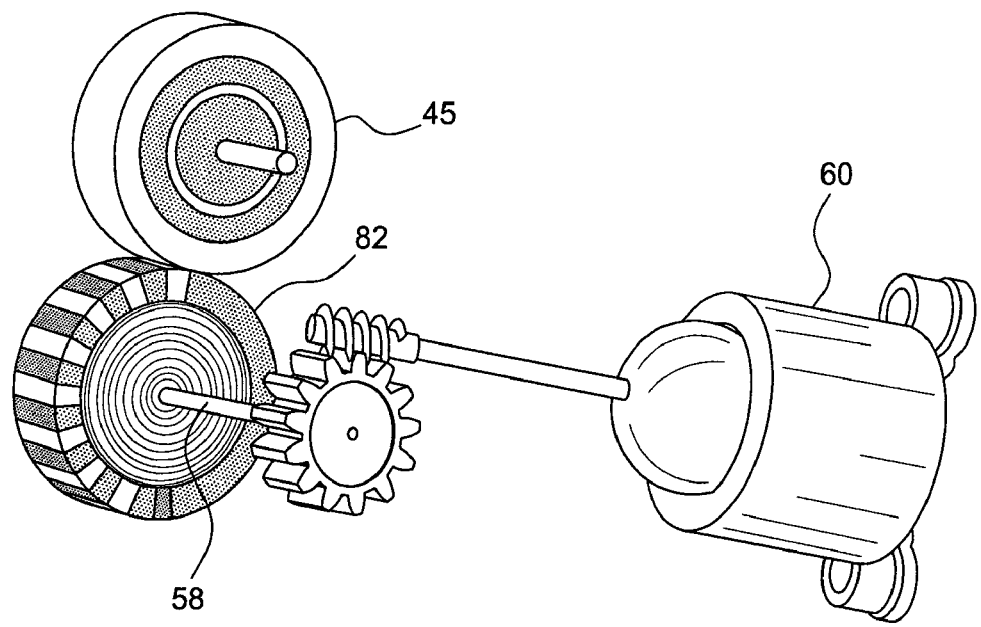
FIG. 9 is a schematic illustration of a pair of connector disc, worm gear assembly and motor as used in the present invention.

Referring now to FIG. 9 the first and second connective disc 45 and 52 are in contact with one another and rotate in opposite directions about their respective axes. The disc 52 is rotated about it's axes by a shaft 58 connected to a motor 60 through the worm gear assembly 44.

Figure 10:
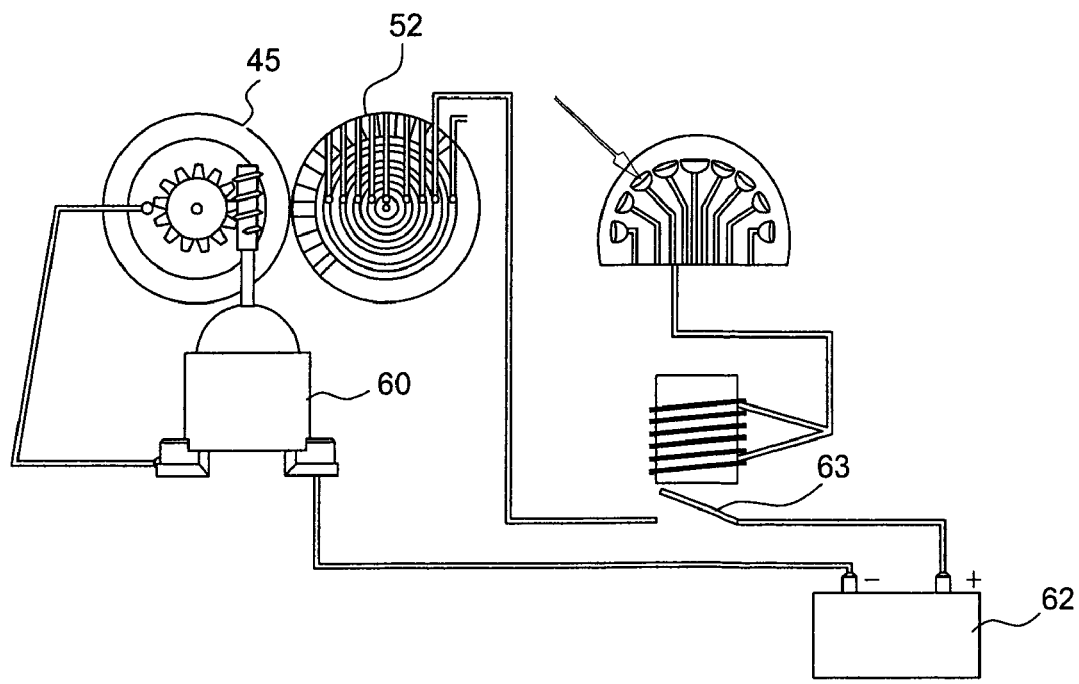
FIG. 10 is a schematic illustration of a circuit for connecting a battery to a motor in response to a signal from a photocell.
Figure 11:
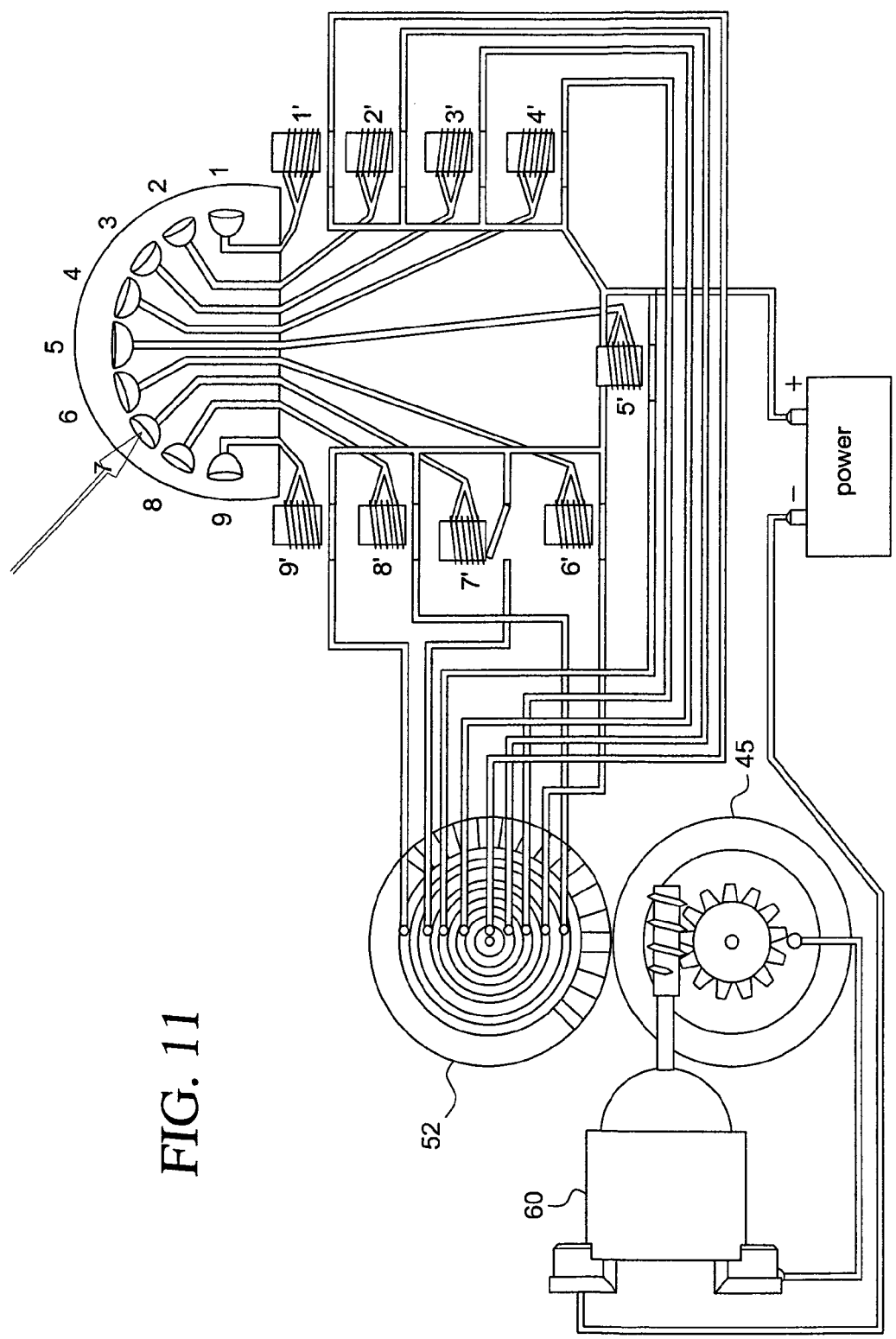
FIG. 11 is a schematic illustration of a portion of a solar tracking system in accordance with the present invention.
Figure 12A:
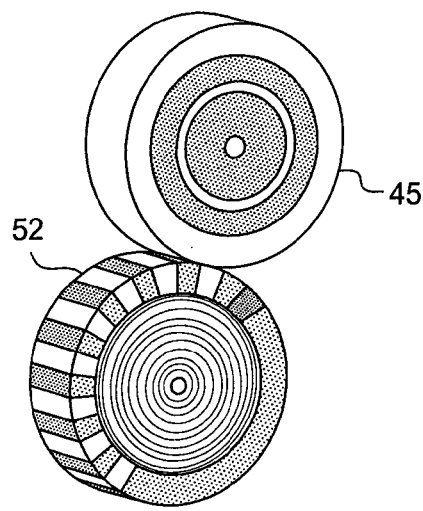
FIGS. 12a, b, c, and d are a schematic illustration of the connection disc.
Figure 12B:
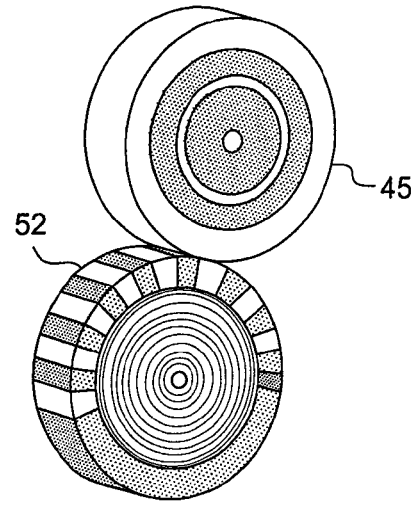
Figure 12C:
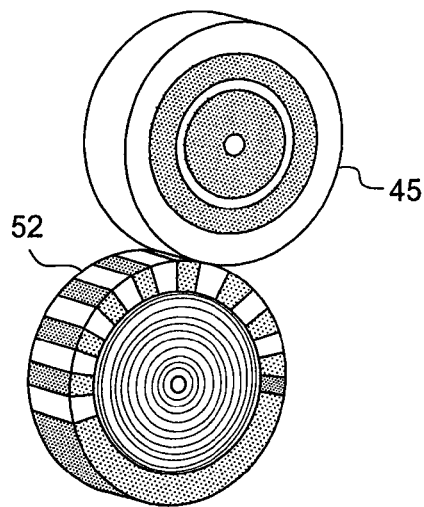
Figure 12D:
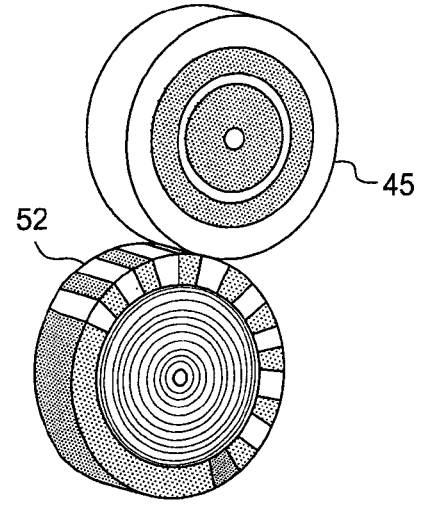

As shown in FIGS. 10 and 11 a battery 62 is connected to a switch 63 that completes a circuit through the disc 52 by a plurality of contacts so that the motor 60 causes the disc 48 to move and thereby move the mirror or mirrors 22 (see FIG. 1).

The rotation of the mirrors or mirror 22 will now be described in connection with FIG. 11. As shown, the system includes a plurality of photo cells 1-9 each of which is associated with an electromagnet 1'-9' and a switch that operates by a magnet until the current is cut from one of the conductive connector rings that cuts the current from one of the conductive segments around the boarder of the connection disc 52 to thereby stop the motor when the mirror is in a pre-selected position.

Referring now to FIG. 12, electrical current passes from the connection disc 52 to the connection disc 45 by contact and thus controls the motor 60. The disc 45 is rotated about its axes as illustrated in FIG. 9 in response to one of the contacts with the disc 52 to thereby rotate disc 45. When the connection disc 52 rotates the current is transferred by the touch (contact) between the conductive segments 55 (FIG. 8) of disc 52 and the insulating materials around the connection disc 52 to prevent the flow of current so that the motor will stop.

Figure 13:
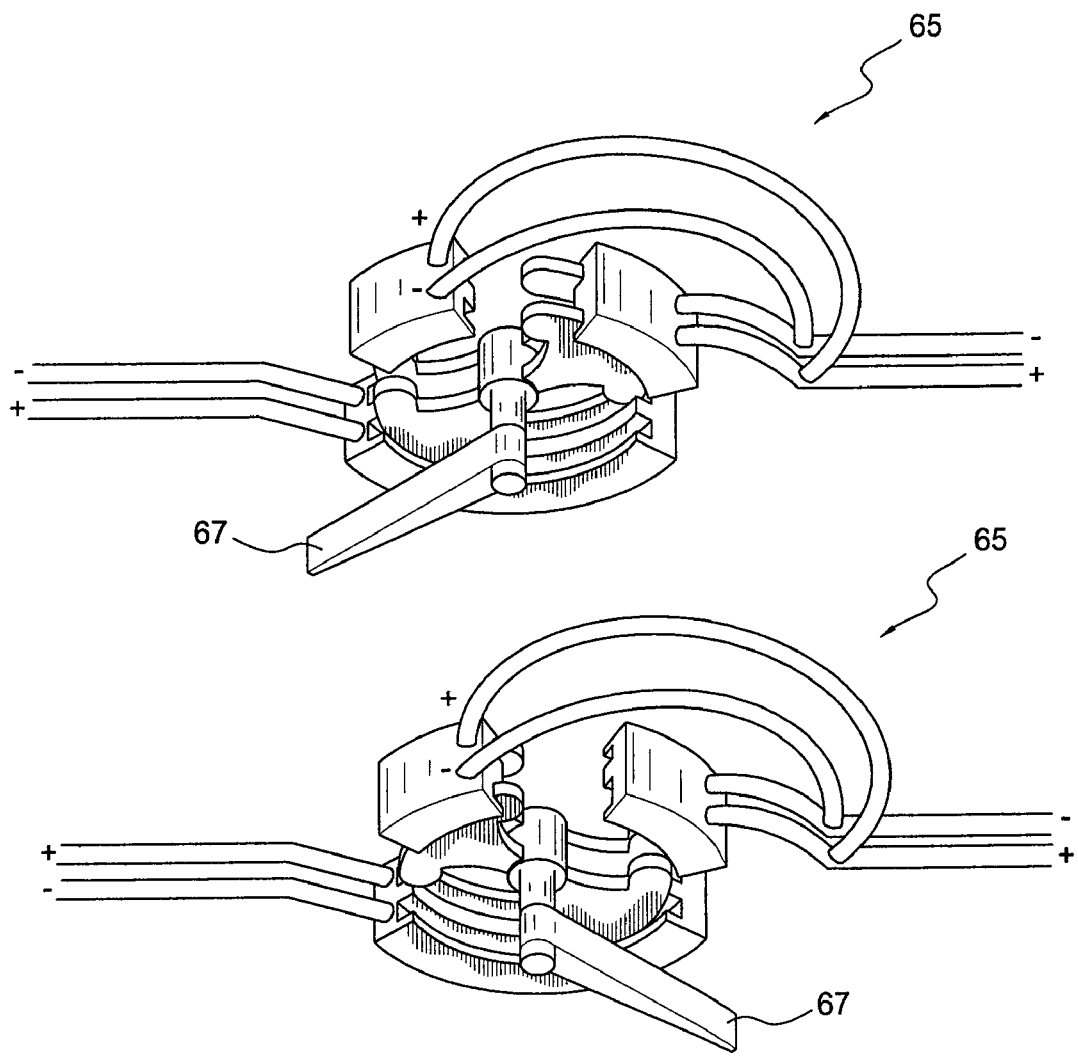
FIG. 13 is a schematic illustration of a reversing apparatus for reversing the current flow in a unit in accordance with the present invention.
Figure 14A:
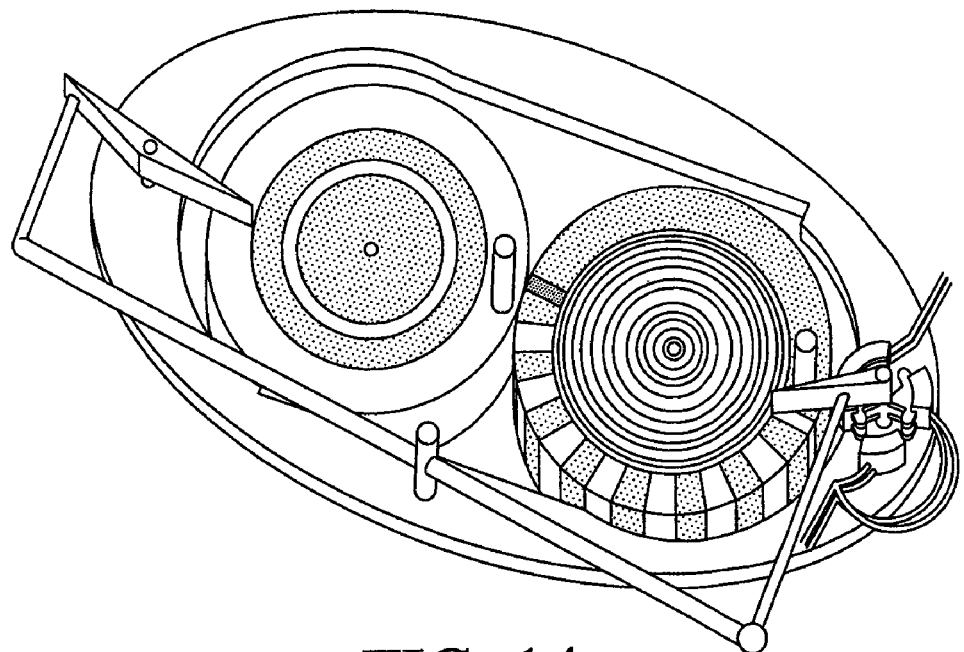
FIGS. 14a and b are a schematic illustration of the apparatus shown in FIG. 13 as embodied in the present invention.
Figure 14B:
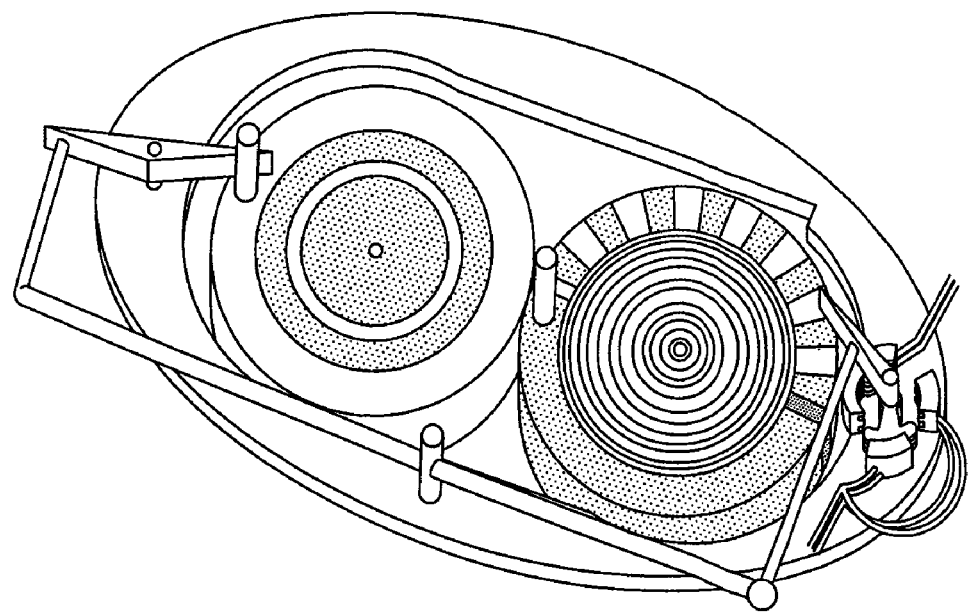

It is also contemplated that the current flow can be reversed by a device 65 as shown in FIGS. 13 and 14. For example, the reversal device 65 is disposed adjacent to the connection disc 45 and 52 and is actuated by a switch trigger 67 or 68 that is moved in response to a pin 69 in the connection disc 52 and by a pin 70 disposed in the connection disc 45. To be more specific one of the switch triggers 67 and 68 rotates at the end of a half cycle and then the pin rotates the second switch trigger in the opposite direction to return the current by the simple mechanical mechanism shown in FIGS. 14a and 14b.

The above description defines an apparatus for moving one or more mirrors about a horizontal and/or vertical axis. However, it is contemplated that it will be necessary to also rotate the mirrors about second or vertical axes. Thus, it will be necessary to utilize two such apparatus to accurately move the mirror as the earth moves with respect to the sun at different times of the year.

While the invention has been described in connection with its preferred embodiments it should be recognized that changes and modifications may be made therein without departing from the scope of the appended claims.

What is claimed is:

1. A solar tracking unit for concentrating the sun's rays on an absorption receptor, said unit comprising:
   a concave reflector for receiving and reflecting the rays of the sun;
   an energy absorption receptor disposed between the sun and said reflector;
   a mass of energy absorbing fluid flowing through said receptor for heating by the reflected sun's rays focused on said receptor by said reflector;
   a first plurality of photovoltaic cells disposed about a hemispherical form for generating an electrical signal to rotate said reflector about a first axis;
   a first motor and a first worm gear assembly for incrementally rotating said reflector about said first axis in response to a signal from said first plurality of photovoltaic cells;
   a second plurality of photovoltaic cells disposed about a hemispherical form for generating an electrical signal to rotate said reflector about a second axis;
   a second motor and a second worm gear assembly for incrementally rotating said reflector about said second axis in response to a signal from said second plurality of photovoltaic cells; and
   whereby said reflector is positioned to concentrate the reflected sun's rays on said receptor.

2. A solar tracking unit for concentrating the sun's rays on an absorption receptor according to claim 1 in which said second axis is perpendicular to said first axis and movement about said first and second axes tilt said reflector to maintain its focus on a line commensurate with said energy absorption receptor.

3. A solar tracking unit for concentrating the sun's rays on an absorption receptor according to claim 2 in which said energy absorbing fluid is water.

4. A solar tracking unit for concentrating the sun's rays on an absorption receptor according to claim 2 wherein each of said motors is a reversible motor.

5. A solar tracking unit for concentrating the sun's rays on an absorption receptor according to claim 4 in which said reflector is a parabolic reflector.

6. A solar tracking unit for concentrating the sun's rays on an absorption receptor according to claim 5 in which each of said photovoltaic cells include a transparent or translucent cover that limits penetration to vertical rays only.

7. A solar tracking unit for concentrating the sun's rays on an absorption receptor according to claim 6 that includes a first connection disc including a conductor ring inside of said first connection disc and a second connection disc of non-conductive material that is divided into arch shaped segments of conductive material and wherein said second connection disc is in contact with a periphery of said first connection disc for rotation therewith and wherein one of said connection discs is connected to one of said motors through one of said worm gear assemblies.

8. A solar tracking unit for concentrating the energy from the sun's rays on an absorption tube, said unit comprising of:
   a concave parabolic reflector for receiving rays of the sun and focusing the reflected rays on a focal point;
   an energy absorbing tube disposed between the sun and the reflector on the focal point of said parabolic reflector;
   a mass of water flowing through said energy absorbing tube for heating by the reflected rays of the sun;
   a first plurality of photovoltaic cells disposed about a hemispherical form for generating an electrical signal to rotate said reflector about a horizontal axis;
   a first reversible motor and a first worm gear assembly for incrementally rotating said reflector about the horizontal axis in response to a signal from one of said first plurality of photovoltaic cells;
   a second plurality of photovoltaic cells disposed about a hemispherical form for generating an electrical signal to rotate said reflector about a vertical axis;
   a second reversible motor and a second worm gear assembly for incrementally rotating said reflector about the vertical axis in response to a signal from said second plurality of photovoltaic cells;
   whereby said reflector is positioned to concentrate the reflected rays of the sun on said receptor;
   wherein each of said photovoltaic cells includes a transparent or translucent glass cover that limits penetration to vertical rays only; and
   wherein said solar tracking unit includes a first connection disc including a conductor ring inside of said first connector disc and a second connector disc of non-conductive material that is divided into arch shaped segments of conductive material and wherein said connection device is in contact with a peripheral area of said first connection disc for rotation therewith of one of said connection disc being connected to one of said motors through one of said worm gear assemblies.

9. A solar powered sun following steam turbine consisting of:
   a concave reflector for receiving reflection and concentrating sunlight at or along a focal point or line;
   an energy absorption receptor disposed on said focal point or focal line to receive reflective rays from the sun;

a mass of water and means for conducting said flow of water into said receptor for conversion into steam by the focused sunlight;

a steam box for receiving steam generated by the heat of the sun's rays on said receptor;

a turbine and a generator operatively connected to said turbine and means for directing said steam into said turbine to thereby turn said generator to generate electric energy;

a steam condenser and means for feeding water from said condenser to said receptor;

a first plurality of photovoltaic cells disposed around a hemispherical form for generating an electrical signal to incrementally rotate said reflector about a horizontal axis;

a first motor and a first worm gear assembly for incrementally rotating said reflector about the horizontal axis in response to a signal from said first plurality of photovoltaic cells;

a second plurality of photovoltaic cells disposed about a hemispherical form for generating an electrical signal to rotate said reflector about a vertical axis;

a second motor and a second worm gear assembly for incrementally rotating said reflector about said vertical axis in response to a signal from second plurality of photovoltaic cells; and wherein said reflector is positioned to focus the sun's rays on said receptor throughout the daylight hours.

10. A solar powered sun following steam turbine according to claim 9 in which said reflector is parabolic reflector.

11. A solar powered sun following steam turbine according to claim 10 in which each of said motors is a reversible motor.

12. A solar powered sun following steam turbine according to claim 11 in which each of said photovoltaic cells includes a transparent cover that limits penetration of light rays to vertical rays only.

* * * * *